July 8, 1947. W. E. DAUGHERTY 2,423,585
VEHICLE RUNNING GEAR
Filed Aug. 26, 1944 5 Sheets-Sheet 1

INVENTOR.
WILLIAM E. DAUGHERTY
BY
J. H. Weatherford
Atty

July 8, 1947.  W. E. DAUGHERTY  2,423,585
VEHICLE RUNNING GEAR
Filed Aug. 26, 1944  5 Sheets-Sheet 2

INVENTOR.
WILLIAM E. DAUGHERTY

July 8, 1947.  W. E. DAUGHERTY  2,423,585
VEHICLE RUNNING GEAR
Filed Aug. 26, 1944   5 Sheets-Sheet 5
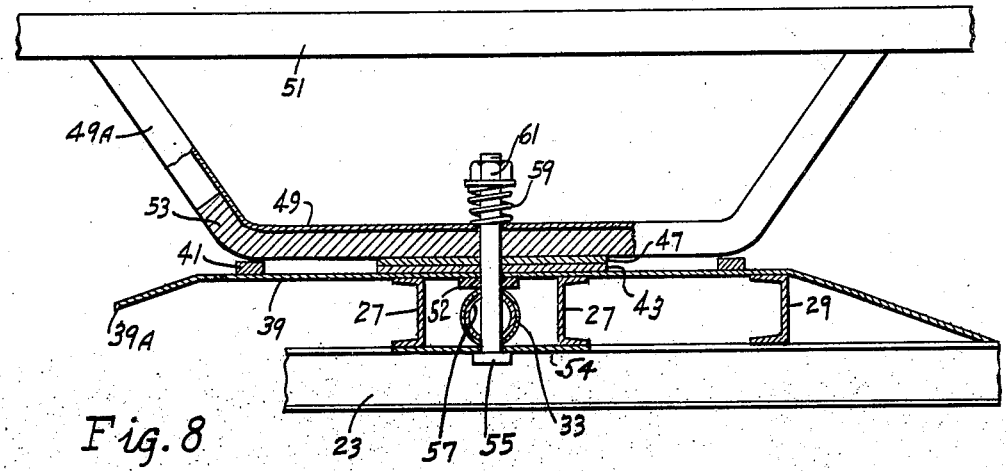
Fig. 8
Fig. 9
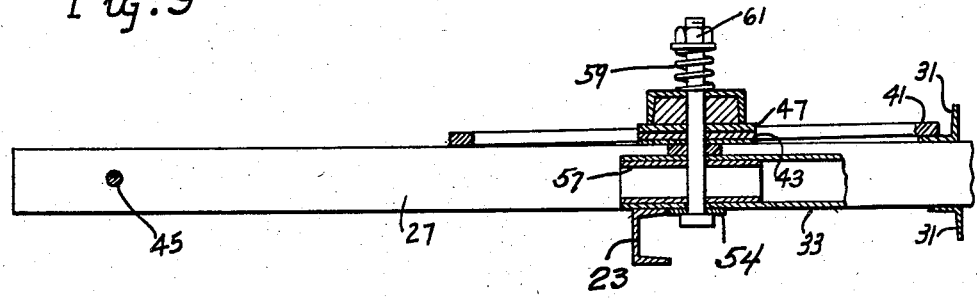
INVENTOR.
WILLIAM E. DAUGHERTY
BY
J H Weatherford
Atty.

Patented July 8, 1947

2,423,585

UNITED STATES PATENT OFFICE 2,423,585

VEHICLE RUNNING GEAR

William E. Daugherty, Covington, Tenn.

Application August 26, 1944, Serial No. 551,306

6 Claims. (Cl. 280—109)

This invention relates to trailers of four wheel type, and particularly to the chassis thereof.

The objects of the present invention are:

To provide rugged front and rear frames and coupling means allowing universal adjustment of the one with respect to the other;

To provide front and rear frames each respectively built up substantially entirely of structural members;

To provide front and rear structural frames each rigidly braced against side and end thrust and accomplishing a maximum of support for the members used;

To provide a simple and effective king pin coupling for the front bolster and coupling plate;

To provide a simple and efficient coupling means between the coupling pole and the rear frame, permitting longitudinal adjustment of the coupling length and transverse turning movement of the rear frame relatively to the pole, and generally to improve the design and construction of such a structure.

The means by which the foregoing and other objects are accomplished, and the manner of their accomplishment, will readily be understood from the following specification on reference to the accompanying drawings, in which:

Fig. 8 is a fragmentary enlarged transverse sectional elevation on the line VIII—VIII of Fig. 1, showing an enlarged detail of the king pin and associated parts; and Fig. 9 a similarly enlarged fragmentary sectional elevation through the king pin.

Figure 1:
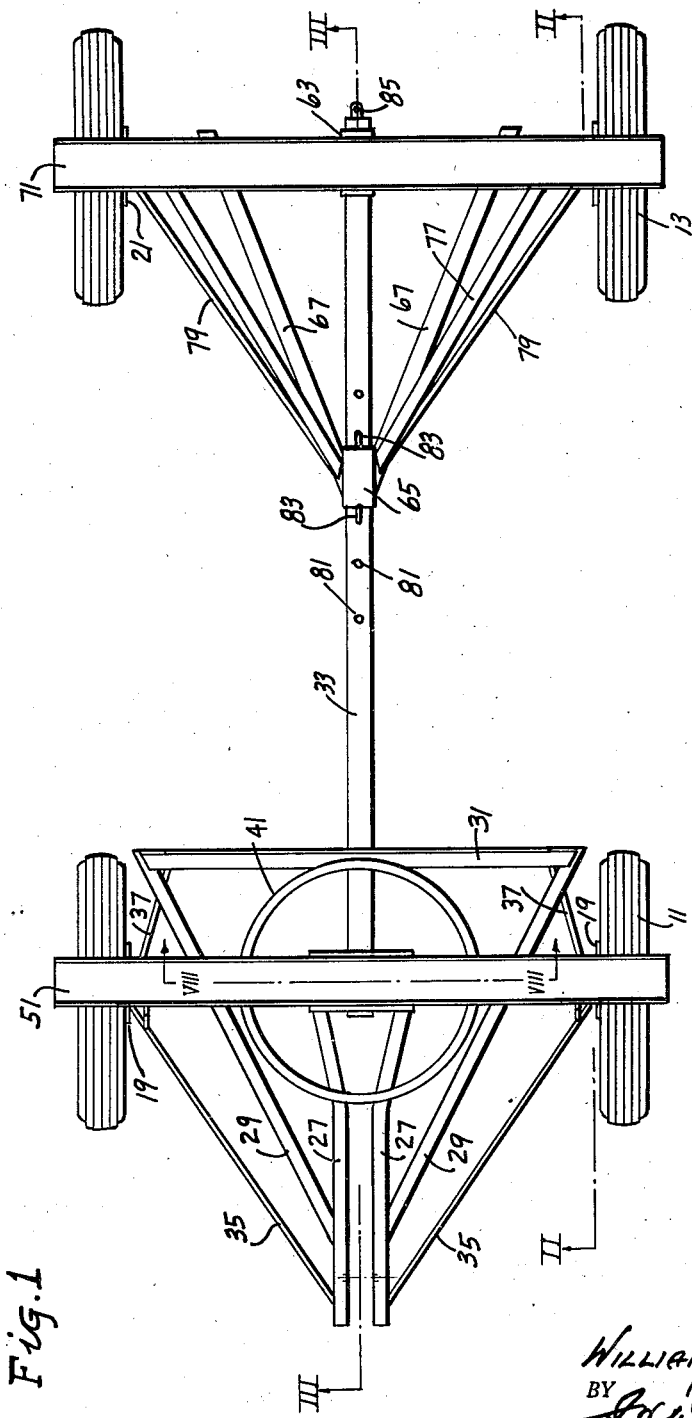
Fig. 1 is a plan view of the chassis and wheels.
Figure 2:
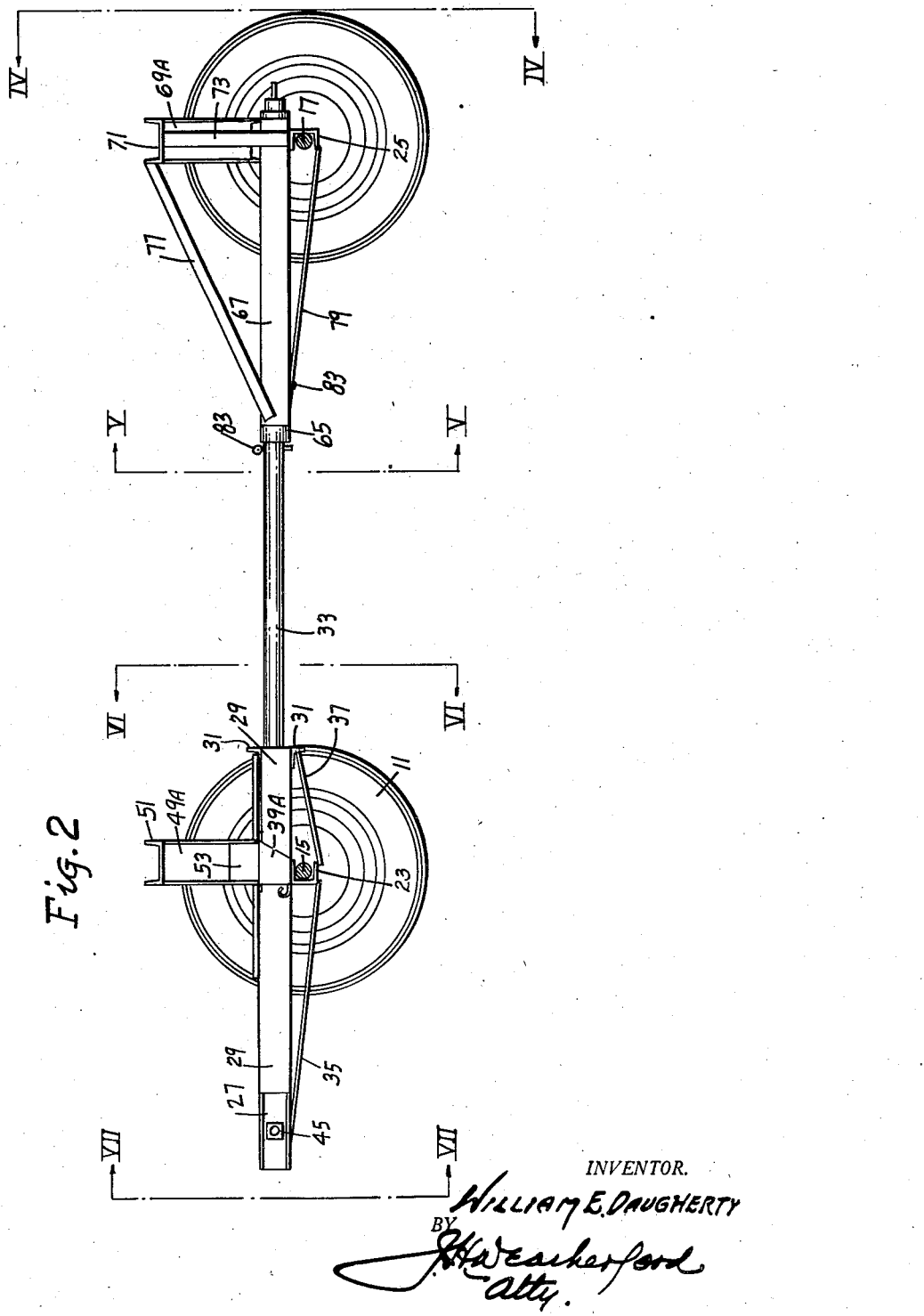
Fig. 2 is a side elevation of the chassis with the wheels on one side cut away along the line II—II of Fig. 1.
Figure 3:
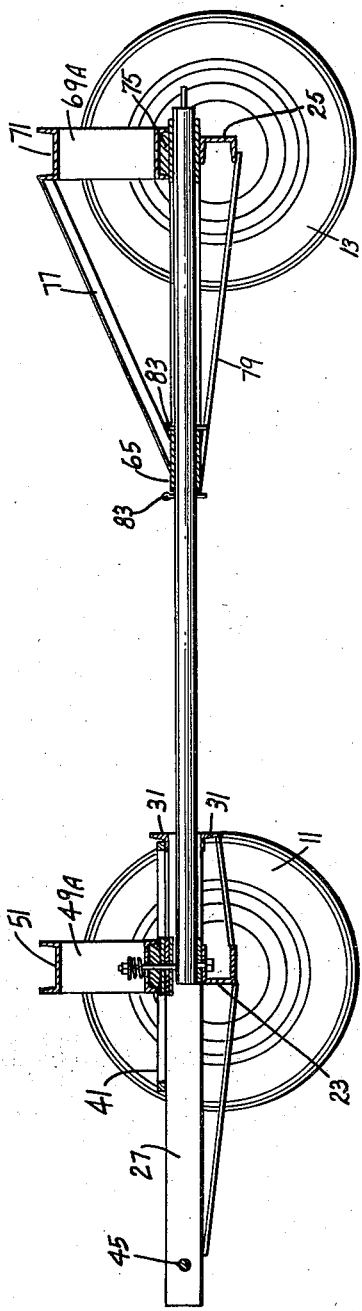
Fig. 3 is a sectional elevation of the chassis on the line III—III of Fig. 1.
Figure 4:
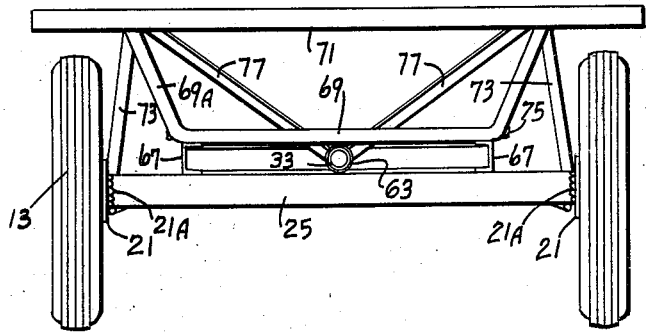
Fig. 4 is a view of the rear end of the chassis, looking in the direction of the arrows IV—IV of Fig. 2.
Figure 5:
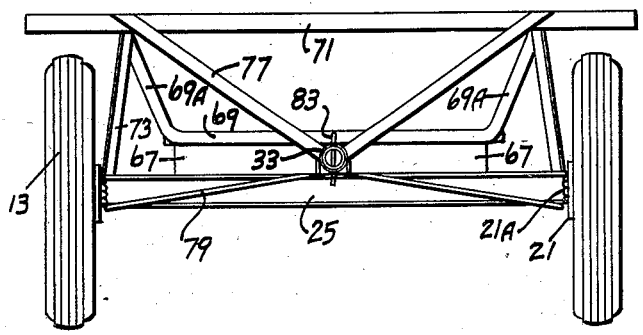
Fig. 5 is an opposite elevation taken as on the line V—V of Fig. 2.
Figure 6:
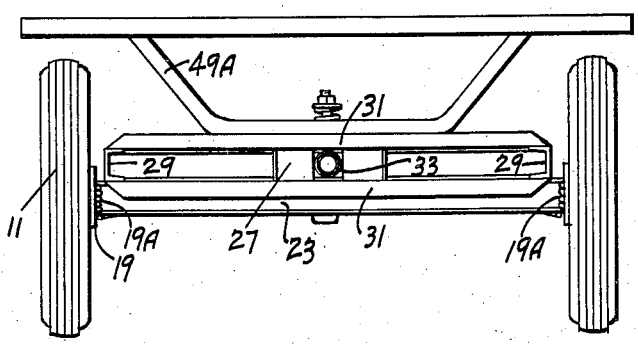
Fig. 6 is an elevation of the rear end of the front frame taken as on the line VI—VI of Fig. 2.
Figure 7:
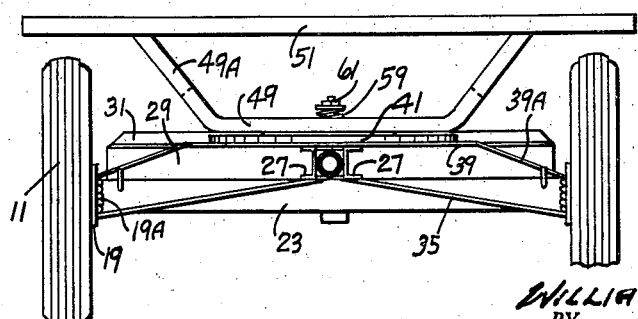
Fig. 7 a corresponding front elevation, in the direction of the arrows VII—VII of Fig. 2.

Referring now to the drawings in which the various parts are indicated by numerals:

11 are the front, and 13 the rear wheels which are journalled on suitable axle skeins 15, 17, Fig. 2. These axle skeins protrude from disc-like flanges 19, 21 which are respectively rigidly secured as by welding 19A, 21A to the opposite ends of transversely disposed channel section front and rear axle members 23 and 25. A pair of substantially parallel draft members 27, preferably of channel section, and having their rear ends flared apart, are supported on and are secured to the front axle member 23.

Secured to the opposite sides of these draft members adjacent their forward ends, are additional channels 29, forming hounds, which diverge rearwardly, overlie and are secured to the axle member 23, and rearward thereof are joined at their ends by upper and lower transversely disposed angle irons 31, the channels 29 lying between and spacing these angle irons 31 apart to form guide slots for a coupling pole 33, which will be later described.

Also secured to the draft members 27, substantially at their forward ends, are brace rods 35 which converge toward the axle member 23 in adjacency to the wheels and are joined to the underside of this axle member. 37 are brace rods extending rearwardly from the axle member 23 to the members 31.

Overlying the rear ends of the draft members 27, and also overlying the members 29 and alined above the axle member 23, is a narrow plate-like member or strap 39, the outer ends 39A of which are downwardly deflected into contact with the axle member 23 in adjacency to the ends thereof and to the discs 19. Resting on this plate, on the draft members 27 forwardly of the plate, and on the upper of the angle members 31, is a ring 41 which serves as a fifth wheel. 43 is a wear plate, supported and secured on the plate-like member 39. The parts are secured together and integrated by welding. The forward end of the draft members 27 are suitably apertured to receive a pin 45 through which a suitable tongue, not here shown, may be coupled to the draft members.

Supported by the wear plate 43 is a bolster plate 47, which in turn supports a bolster yoke 49 of channel cross section, having arm portions 49A extending upwardly and supporting a transversely disposed bolster 51. The legs of the yoke channel are preferably downwardly faced and the channel filled in with a reinforcing member 53 which may extend a short distance upward along the arm portions. All parts are integrated by welding.

As shown in Figs. 8 and 9, a rubber cushion 52 may be inserted between the strap 39 and the coupling pole 33. In these views, the axle member 23 is shifted forwardly of the king pin and a draft plate 54 underlies the draft members 27, and abuts the rear edge of the top flange of the axle 23, the plate being welded to the flange and the draft members 27.

Centrally, the top flange of the axle member 23, or the draft plate 54, as the case may be, the strap, wear plates, bolster yoke, and reinforcing member are apertured to receive a king pin 55 which extends through all thereof and in addition passes through a suitable hole in the front end of the coupling pole 33, this end of the coupling pole preferably being reinforced by a liner 57. 59 is a compression spring, which is held down by a nut 61 on the king pin against the upper side of the yoke 49 of the bolster.

The rear frame of the trailer includes, in addition to the axle member 25, a sleeve member 63 overlying and secured to the axle member 25, a second sleeve member 65 spaced forwardly thereof, the two sleeve members being alined and adapted to slidably and turnably receive the coupling pole 33. Secured to the forward sleeve member 65 are hounds 67, of channel section, which diverge therefrom into overlying relation with the axle member 25 to which they are secured.

Disposed on and secured to these hounds in alinement over the axle member is a channel iron 69 having upwardly extending arm portions 69A which extend upward to and support a channel member rear bolster 71.

73 are struts secured to the bolster 71 in adjacency to the yoke arm 69A and extending downward therefrom and secured to the axle members 25 adjacent the axle discs 21. The flanges of the yoke channel are downwardly faced and the horizontal run of the channel is preferably reinforced by a filler 75.

In addition to the hounds 67, braces 77 are secured to the forward sleeve 65 and extend upwardly and diverge outwardly into bracing engagement with the bolster 71 adjacent the upper ends of the struts 73 and arms 69A. Braces 79 are also secured to the sleeve 65 and diverge therefrom into underlying relation to the axle member 25 to which they are secured, the entire structure forming a rigidly braced and supported rear axle bolster. The members are secured and integrated together, as by welding.

The coupling pole 33 has holes 81 therethrough, these holes being spaced apart a slightly greater distance than the sleeve 65 to permit insertion of pins 83 which confine the coupling pole against longitudinal movement with relation to the sleeve. Should it be desired to shorten or lengthen the pole, pins 83 are removed and replaced, after shift, in additional ones of the holes. An apertured link 85 may be secured in the end of the coupling pole, as for coupling on additional trailer units, or the like, should it be desired. Preferably the coupling pole is internally reinforced by a sleeve, corresponding to the reinforced sleeve 57 at the front of the pole, where the holes 81 occur therein.

It will be seen that the pivotal securing of the front bolster permits pivotal movement of the front frame of the trailer to any desired degree, with reference to the bolster and coupling pole, this movement being limited only by contact of the front wheels with the coupling pole and that the turning movement of the coupling pole with respect to the rear frame permits any amount of movement of the rear bolster with relation to the front bolster that may be set up by inequalities of the road surface.

I claim:

1. In a wheeled trailer including a front assembly, a rear assembly and a coupling pole; a said front assembly including a channel section axle member, a pair of channel section draft members overlying and secured to said axle member and extending forwardly therefrom, hounds of channel section secured to said draft members adjacent their forward ends diverging rearwardly from said draft members in overlying relation across and rearwardly of said axle, and secured thereto, transverse members of angle section respectively over and underlying the rear ends of said hound member, secured thereto and spanning therebetween to form a slot embracing said coupling pole, brace members secured to said draft members adjacent their forward ends and diverging into underlying relation with said axle member adjacent its ends, a plate-like strap secured at its opposite ends to said axle member and extending longitudinally thereof, said strap being spaced from said axle member intermediate its length to overlie said hounds and said draft members, and being secured to each thereof, a wear plate overlying said draft members and strap and secured to said strap, a fifth wheel ring, surrounding said wear plate, supported by and secured to said draft members, said strap and the upper of said transverse members, all of said members being integrally secured by welding; a bolster assembly comprising parts integrated by welding, including a bolster plate seated on said wear plate, a yoke member having a horizontal portion supported on and secured to said bolster plate and extending into overlying relation to said ring, and upwardly diverging arm portions, and a bolster supported by said arms and secured thereto; and a king pin, centrally disposed with regard to said axle and bolster assembly, coupling said axle and integrated parts, said bolster assembly, and said coupling pole; said axle member, said strap, and said wear plate, said coupling pole and said bolster yoke members being apertured to receive said pin.

2. In a wheeled trailer including a front assembly, a rear assembly and a coupling pole; a said front assembly including a channel section axle member, a pair of channel section draft members overlying and secured to said axle member, and extending forwardly therefrom, hounds of channel section secured to said draft members adjacent their forward ends diverging rearwardly from said draft members in overlying relation across and rearwardly of said axle, and secured thereto, transverse members respectively over and underlying the rear ends of said hound member, secured thereto and spanning therebetween to form a slot embracing said coupling pole, brace members secured to said draft members adjacent their forward ends and diverging into underlying relation with said axle member adjacent its ends, plate-like means overlying said hound and draft members, and secured to each thereof, a fifth wheel ring, supported by and secured to said draft members, said plate-like means and the upper of said transverse members, all of said members and said plate-like means being integrally secured by welding; a bolster assembly comprising parts integrated by welding, including a bolster plate seated on said plate-like means, a yoke member having a horizontal portion supported on and secured to said bolster plate and extending into overlying relation to said ring, and upwardly diverging arm portions, and a bolster supported by said arms and secured thereto; and a king pin, centrally disposed with regard to said axle and bolster assembly, coupling said axle and integrated parts, said bolster assembly, and said coupling pole; said axle member, said plate-like parts, said coupling pole and said bolster yoke members being apertured to receive said pin.

3. In a wheeled trailer including a front assembly, a rear assembly, a coupling pole and a king pin coupling said pole to said front assembly; a said rear assembly including a channel section axle member, a pair of channel section hounds overlying and secured to said axle member and extending forwardly therefrom, said hounds at their rear ends being spaced apart and converging forwardly, a sleeve, shiftably and turnably embracing said pole, disposed at the forward ends of said hounds and secured therebetween and thereto, a bolster support of channel section having a horizontal portion, alined over said axle member, supported on, and secured to, said hounds, and having upwardly diverging arm portions, a bolster disposed in alinement with said axle, secured to and supported by said arm portions, struts supported by said axle member adjacent its ends and extending upwardly and secured to said bolster in adjacency to said arms, diverging brace members secured to said sleeve extending rearward and upwardly and secured to said bolster in adjacency to said arms, means carried by said coupling pole, cooperating with said sleeve to prevent longitudinal shift of said pole relatively thereto, and a second sleeve shiftably and turnably embracing said pole, centrally disposed along said axle members in overlying relation thereto, and secured to said axle, all of the secured parts being integrated by welding.

4. In a wheeled trailer including a coupling pole and a rear assembly, said rear assembly including an axle member, a pair of hounds overlying and secured to said axle member and extending forwardly therefrom, said hounds at their rear ends being spaced apart and converging forwardly, a sleeve, shiftably and turnably embracing said pole, disposed at the forward ends of said hounds and secured therebetween and thereto, a bolster support alined over said axle member and secured to said hounds, and having upwardly diverging arm portions, a bolster disposed in alinement with said axle, secured to and supported by said arm portions, struts supported by said axle member adjacent its ends and extending upwardly and secured to said bolster in adjacency to said arms, diverging brace members secured to said sleeve extending rearward and upwardly and secured to said bolster in adjacency to said arms, means carried by said coupling pole, cooperating with said sleeve to prevent longitudinal shift of said pole relatively thereto, and a second sleeve shiftably and turnably embracing said pole, centrally disposed along said axle member in overlying relation thereto, and secured to said axle.

5. In a wheeled trailer including a front assembly, a rear assembly, a coupling pole and a king pin coupling said pole to said front assembly; a said rear assembly including an axle member, a pair of hounds overlying and secured to said axle member and extending forwardly therefrom, said hounds at their rear ends being spaced apart and converging forwardly, a sleeve, shiftably and turnably embracing said pole, disposed at the forward ends of said hounds and secured therebetween and thereto, a bolster support, alined over said axle member, supported on, and secured to, said hounds, and having upwardly diverging arm portions, a bolster disposed in alinement with said axle, secured to and supported by said arm portions, struts supported by said axle member adjacent its ends and extending upwardly and secured to said bolster in adjacency to said arms, diverging brace members secured to said sleeve extending rearward and upwardly and secured to said bolster in adjacency to said arms, means carried by said coupling pole, cooperating with said sleeve to prevent longitudinal shift of said pole relatively thereto, and a second sleeve shiftably and turnably embracing said pole, centrally disposed along said axle member in overlying relation thereto, and secured to said axle.

6. In a wheeled trailer including a front assembly, a rear assembly, a coupling pole and a king pin coupling said pole to said front assembly; a said rear assembly including a channel section axle member, a pair of channel section hounds overlying and secured to said axle member and extending forwardly therefrom, said hounds at their rear ends being spaced apart and converging forwardly, a sleeve, shiftably and turnably embracing said pole, disposed at the forward ends of said hounds and secured therebetween and thereto, a bolster support of channel section having a horizontal portion, alined over said axle member, supported on, and secured to, said hounds, and having upwardly diverging arm portions, a bolster disposed in alinement with said axle, secured to and supported by said arm portions, struts supported by said axle member adjacent its ends and extending upwardly and secured to said bolster in adjacency to said arms, diverging brace members secured to said sleeve extending rearwardly, and upwardly and secured to said bolster in adjacency to said arms, means carried by said coupling pole, cooperating with said sleeve to prevent longitudinal shift of said pole relatively thereto, and a second sleeve shiftably and turnably embracing said pole, centrally disposed along said axle members in overlying relation thereto, and secured to said axle, all of the secured parts being rigidly secured.

WILLIAM E. DAUGHERTY.

REFERENCES CITED

The following references are of record in the file of this patent:

UNITED STATES PATENTS

| Number | Name | Date |
| --- | --- | --- |
| 2,183,682 | Kudrna | Dec. 19, 1939 |
| 816,852 | Einfeldt | Apr. 3, 1906 |
| 1,223,152 | Cove | Apr. 17, 1917 |
| 1,973,938 | Voorhees, Jr. | Sept. 18, 1934 |
| 2,361,869 | Randall | Oct. 31, 1944 |
| 972,658 | Smith | Oct. 11, 1910 |